3,303,028

FORMATION OF DIAZO COUPLERS IN SITU

Claude M. Aebi, Endicott, and Leon A. Teuscher, Rochester N.Y., assignors to International Business Machines Corporation, New York, N.Y., a corporation of New York No Drawing. Filed Nov. 20, 1963, Ser. No. 325,155
9 Claims. (Cl. 96—91)

The present invention relates to light sensitive, heat developable diazonium compositions and to elements comprising such compositions. More specifically, this invention relates to diazonium compositions and related products which may be developed by heat without the application of any discrete developer.

The diazo compositions most widely employed in conventional diazo coatings comprise a light decomposable diazonium salt, an organic coupling component and an acid. An element coated with this composition is exposed to light through a negative or positive and the diazonium salt is decomposed only in the areas exposed to light. The unexposed areas remain undecomposed and are subject to further reaction in the presence of an alkaline reagent to produce a colored image with the coupler. The ability of the light sensitive diazonium compound to enter a coupling reaction is destroyed in those areas which have been exposed to light. The alkaline material for promoting the reaction is generally ammonia, applied either as a gas or as a solution.

It is well known that the reaction of a diazo compound with a coupler conventionally is inhibited by maintaining the ingredients in an acid environment. Consequently, when the pH of such systems is shifted to the alkaline range, the coupler and diazo will combine to form visible image.

Light sensitive papers coated with such compositions have been produced commercially, but generally can be stored for only limited periods under high humidity and temperature conditions. Besides this limited storage or shelf life, the conventional papers are developed by the application of a separate alkaline medium, such as ammonia, which produces noxious by-product vapors. In addition, relatively complex copying devices are required for use in conjunction with such copying papers, since means must be provided for generating the developing fluids and for evacuating the by-products vapors.

The object of this invention, therefore, is to overcome the difficulties associated with conventional diazonium copying papers and compositions. More specifically, it is an object of the present invention to provide a diazo composition which may be employed in relatively simple azo copying devices wherein no means for generating developing fluids or evacuating noxious by-product vapors need be provided.

Another object of this invention is to provide a light sensitive diazonium composition that is developable by heat alone.

Another object of this invention is the provision of a diazonium composition which may be employed as a coating on various substrates to produce highly useful photosensitive copying papers.

Another object of this invention is to provide heat developable diazo papers, films, or like elements that have improved shelf life under conditions of high humidity and temperature.

The present invention comprises thermodevelopable light sensitive diazonium compositions and elements comprising a compound capable of being dehydrated to form a diazo coupling component in situ. More specifically, the present invention comprises light sensitive diazonium compositions containing as a latent coupling component a γ-keto alcohol, a β or γ-acid alcohol, a γ-lactone or mixtures thereof. Upon dehydration, the foregoing compounds contain active methylene groups which are capable of entering color-forming or coupling reactions with light sensitive diazonium salts.

Although the above compositions may be developed thermally with satisfactory results, a preferred embodiment of the invention and one which results in more rapid development comprises, including in the composition, as a dehydrating agent, a cyanoguanidine compound. The cyanoguanidine or derivative thereof accelerates the dehydration of the latent coupling component and also generates an alkaline medium which alters the pH of the system and promotes the color-forming reaction.

In general, the latent coupling components of the present invention may be dehydrated by heating to temperatures of about 100° C.–180° C. to form active coupling components containing reactive methylene groups. However, the reaction proceeds relatively slowly in the absence of the cyanoguanidine or derivative dehydrating agent. In the presence of the dehydrating agents of the present invention, development may be accomplished in a matter of a few seconds.

The latent coupling compounds or coupler generators of the present invention have the following general formulae:

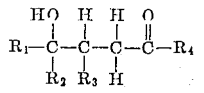

γ-keto alcohol (hydroxy ketones)

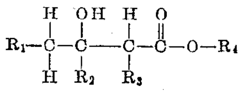

β-hydroxy acid

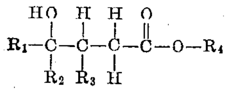

γ-hydroxy acid and its reaction product formed as a result of heating

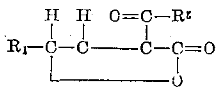

γ-lactone

In the above formulae, $R_1$, $R_2$, $R_3$ and $R_4$ may be various substituted or unsubstituted radicals including alkyl, aryl, cycloalkyl or $$-\overset{\overset{\displaystyle O}{\|}}{C}-,\ -OH,\ -CN$$

halogen, amino or hydrogen groups. The radicals will be selected to obtain adequate activation of the methylene group upon dehydration.

Typical light-sensitive diazonium compounds useful in the present invention include, for example:

p-diazo dimethyl aniline zinc chloride
p-diazo diethyl aniline zinc chloride
p-diazo ethyl-hydroxyethyl aniline ½ zinc chloride
p-diazo 2,5-diethoxy-benzoylaniline ½ zinc chloride
p-diazo ethyl-benzylaniline ½ zinc chloride
p-diazo 1-morpholinobenzene ½ zinc chloride
p-diazo 2,5-dibutoxy 1 morpholinobenzene ½ zinc chloride
p-diazo 2,5-diethoxy 1 morpholinobenzene ½ zinc chloride
p-diazo N-ethyl-O toluidine zinc chloride, etc.

Any combination of the above are to be considered diazonium salts within the scope of this invention.

Specific compounds capable of in situ formation of coupling components and suitable for use in the present invention include the following:

I. γ-Keto alcohols:
  5-hydroxy, 5-phenyl, 2-pentanone;
  γ,γ'-diphenyl, γ-hydroxybutyrophenone.

II. β and γ-hydroxy acids:
  α,γ-diphenyl, β-hydroxybutyric acid;
  3-benzyl, 2,4-diphenyl, 3-hydroxybutanoic acid;
  γ-phenyl, γ-hydroxybutyramide.

III. γ-Lactones:
  α-cyano, γ-phenyl, γ-butyrolactone;
  α-aceto, γ-phenyl, γ-butyrolactone;
  α-carbetoxy, γ-phenyl, γ-butyrolactone;
  α-carboxy, γ-phenyl, γ-butyrolactone.

Thermal development of the present composition not only results in the dehydration of the above compounds to produce a diazo coupler, but the decomposition of the cyanoguanidine or its derivatives results in the generation of alkaline by-products, such as guanylurea and its derivatives.

The simultaneous production of an alkaline environment and the generation of the coupling component permits the color-forming reaction to take place between the coupler and the unexposed light sensitive diazonium compound which results in the formation of the desired image.

As used herein and in the following claims, the term "cyanoguanidine compound" includes cyanoguanidine and its derivatives. In addition to cyanoguanidine, some of the derivatives of this compound which are also useful as dehydration agents for the in situ formation of the coupler and for the simultaneous generation of alkaline by-products include the following, by way of example, cyclohexyl dicyandiamide, O-tolyl dicyandiamide, p-tolyl dicyandiamide and like derivatives, as well as the aldehyde condensation products of cyanoguanidine with formaldehyde, paraformaldehyde, acetaldehyde, benzaldehyde, glyoxal, etc.

The compositions of the present invention are conveniently stabilized by the incorporation of an acid ingredient, such as tartaric, malonic, maleic, citraconic or the like.

The following are examples of various porous or nonporous substrates within the scope of the invention and upon which the present compositions may be applied as coatings to produce useful light sensitive elements: paper, cloth, composition board, glass, metal, plastic film, etc.

The following are various examples of film-forming materials that can be used as carriers or vehicles for the composition of the present invention: cellulose esters, polyvinyl chloride, polyvinylidene chloride, polyvinyl alcohols, polyvinyl butyral, acrylates, methacrylates, etc.

The film-forming or carrier substances are ordinarily dissolved in a volatile organic solvent, such as methanol, and the various other ingredients of the composition are also dissolved or dispersed in the solvent. After application to a suitable substrate, the solvent evaporates leaving a thin film of the carrier containing the ingredients of the thermodevelopable diazonium composition.

The amounts of the various ingredients incorporated in specific compositions may be varied and still produce good results, but satisfactory thermodevelopable compositions of this invention generally comprise up to about 10% by weight of a light sensitive diazonium compound, from about 0.5% to 20% by weight of the coupler generator selected from the group consisting of gamma-keto alcohols, β-hydroxy acids or gamma lactones, and from about 1% to 35% by weight of a cyanoguanidine compound as a dehydrating agent and alkaline medium generator.

The balance of the composition ordinarily comprises a substantial amount of a film-forming vehicle or carrier and minor amounts of various stabilizers, anti-oxidants and the like.

It is felt that the present invention will be more fully appreciated in the light of the following examples which are illustrative of certain preferred embodiments of the invention.

*Example 1*

The following ingredients in the indicated percents by weight are dissolved in a film-forming solution comprising 15% polyvinyl butyral dissolved in methanol:

| | Percent |
|---|---|
| p-Diazo dimethylaniline·$ZnCl_2$ | 2 |
| γ,γ'-Diphenyl γ-hydroxybutyrophenone | 4 |
| Cyanoguanidine | 5 |
| Thiourea | 2 |
| Tartaric acid | .5 |

The above composition is coated on paper, dried and exposed under a master copy for from 5 to 20 seconds. The exposed element is then developed by heating at 150° C. for from 30 to 60 seconds.

*Example 2*

The following ingredients in the indicated percents by weight are dissolved in the film-forming solution of Example 1:

| | Percent |
|---|---|
| p-Diazo 1-morpholinobenzene·$ZnCl_2$ | 1 |
| α,γ-Diphenyl β-hydroxybutyric acid | 2 |
| Cyanoguanidine | 3 |
| Thiourea | 2 |
| Maleic acid | 1 |

The above solution is coated on a transparent plastic substrate, is dried and exposed for from 5 to 20 seconds under a master copy. Development at about 150° C. for from 5 to 30 seconds yields a purple-blue image. Elements of this type, comprising a transparent substrate, are especially useful as film inserts for photoaperture punch cards and like products.

*Example 3*

The following ingredients in the indicated amounts by weight are dissolved in a solution comprising 15% ethylcellulose dissolved in methanol:

| | Percent |
|---|---|
| p-Diazo diethyl aniline·$ZnCl_2$ | 2 |
| α-Aceto γ-butyrolactone | 3 |
| Thiourea | 2 |
| Cyanoguanidine-formaldehyde adduct | 7.5 |
| Itaconic anhydride | 2.5 |

The solution is coated on paper, dried and exposed to light through a master for from about 5 to 20 seconds. The image is then developed by heating at about 150° C. for 20 seconds to produce an intense purple-brown color.

While the invention has been particularly shown and described with reference to preferred embodiments thereof, it will be understood by those skilled in the art that various changes in form and details may be made without departing from the spirit and scope of the invention.

What is claimed is:

1. A light-sensitive, thermo-developable diazonium composition consisting essentially of a light-sensitive diazonium compound; a latent coupling compound, said latent coupling compound being dehydrated when heated to form an active coupling component containing an active methylene group selected from the group consisting of 5-hydroxy 5-phenyl 2-pentanone, γ,γ'-diphenyl γ-hydroxy butyrophenone, 3-benzyl 2,4-diphenyl 3-hydroxy butanoic acid, γ-phenyl γ-hydroxy butyramide and α,γ-diphenyl β-hydroxy butyric acid.

2. A light sensitive thermo-developable diazonium composition consisting essentially of a light-sensitive diazonium composition and a latent coupling compound capable of being dehydrated when heated to form an active coupling component containing an active methylene group, said latent coupling compound having the general formula of

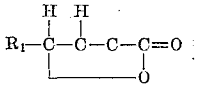

and selected from the group consisting of α-cyano γ-phenyl γ-butyrolactone, α-aceto γ-phenyl γ-butyrolactone, α-carbetoxy γ-phenyl γ-butyrolactone and α-carboxy γ-phenyl γ-butyrolactone.

3. A light-sensitive copying material comprising a substrate coated on at least part of its surface with the residue of the composition of claim 2 deposited after evaporation of said solvent.

4. A composition according to claim 2 wherein the cyanoguanidine compound is selected from the group consisting of cyanoguanidine, cyclohexyl dicyandiamide, o-tolyl dicyandiamide and p-tolyl dicyandiamide.

5. A composition according to claim 2 wherein the stabilizing acid is selected from the group consisting of tartaric acid, malonic acid, maleic acid and citraconic acid.

6. A composition according to claim 2 wherein the film-forming materials are selected from the group consisting of cellulose esters, polyvinyl chloride, polyvinylidene chloride, polyvinyl alcohols, polyvinyl butyral, acrylates and methacrylates.

7. A light-sensitive, thermo-developable diazonium composition comprising:

about 2% by weight of p-diazo dimethyl aniline·zinc chloride salt, about 4% by weight γ,γ'-diphenyl γ-hydroxybutyrophenone, about 5% by weight cyanoguanidine, about 2% by weight thiourea, about .5% by weight tartaric acid, and the balance a solution of a film-forming material in a vaporizable solvent.

8. A light-sensitive, thermo-developable diazonium composition comprising:

about 1% by weight p-diazo 1-morpholinobenzene·zinc chloride salt, about 2% by weight α,γ-diphenyl β-hydroxybutyric acid, about 3% by weight cyanoguanidine, about 2% by weight thiourea, about 1% by weight maleic acid, and the balance a solution of a film-forming material in a vaporizable solvent.

9. A light-sensitive, thermo-developable diazonium composition comprising:

about 2% by weight p-diazo diethyl aniline·zinc chloride salt, about 3% by weight α-aceto γ-butyrolactone, about 2% by weight thiourea, about 7.5% by weight cyanoguanidine-formaldehyde adduct, about 2.5% by weight itaconic anhydride, and the balance a solution of a film-forming material in a vaporizable solvent.

References Cited by the Examiner

UNITED STATES PATENTS

| | | | |
|---|---|---|---|
| 2,374,563 | 4/1945 | Reichel | 96—91 |
| 2,593,928 | 4/1952 | Slifkin | 96—91 X |
| 3,140,180 | 7/1964 | Fritz | 96—75 |
| 3,154,417 | 9/1964 | Aebi et al. | 96—75 |

NORMAN G. TORCHIN, *Primary Examiner.*

ALEXANDER D. RICCI, *Examiner.*

C. L. BOWERS, *Assistant Examiner.*